United States Patent

[11] 3,526,181

[72] Inventors Paul Fahlenberg
Baierbrunn near Munich, Germany;
Heinrich Wildfeuer, Munich-Aubing, Germany
[21] Appl. No. 744,207
[22] Filed July 11, 1968
[45] Patented Sept. 1, 1970
[73] Assignee Compur-Werk Gesellschaft mit beschrankter Haftung & Co.
Munich, Germany
a firm of Germany
[32] Priority July 21, 1967
[33] Germany
[31] No. 1,597,150

[54] PHOTOGRAPHIC SHUTTER WITH IMPULSE CONTROL
10 Claims, 2 Drawing Figs.
[52] U.S. Cl. .................................................. 95/53, 95/63
[51] Int. Cl. ........................................................ G03b 9/58
[50] Field of Search ........................................ 95/53 elec 53

[56] References Cited
UNITED STATES PATENTS
3,092,002 6/1963 Frenk .......................... 95/58
3,348,462 10/1967 Fahlenberg ................... 95/53

Primary Examiner—Norton Ansher
Assistant Examiner—Richard L. Moses
Attorney—Charles Shepard; Stonebraker and Shepard ABSTRACT: The blades of a photographic shutter are operated by an electromagnet. A counting impulse generator produces pulses which are fed to a series of impulse counters which can be pre-set to the required count depending upon the desired length of photographic exposure. The impulse counters are set into operation simultaneously with a first control impulse which activates the electromagnet to open the shutter, and when the pre-set number of impulses have been counted, the impulse counters produce a second control pulse which terminates the exposure.

Patented Sept. 1, 1970

3,526,181

PHOTOGRAPHIC SHUTTER WITH IMPULSE CONTROL

BACKGROUND OF THE INVENTION

Various types of photographic shutters controlled electrically or electronically are known. In one known arrangement, there is a time determining RC (resistance-capacitance) arrangement in combination with at least one magnetic winding (electromagnet or solenoid). In the prior arrangement, however, there is the disadvantage that the resistors, capacitors, and magnetic winding have to be made rather large both from the electrical standpoint and from the mechanical or physical standpoint, if it is required to control a long exposure period or lengthy "time" exposure. This results in difficulties when the overly large constructional elements are installed in the shutter housing or casing, particularly in the case of small shutters such as used on small format or small frame cameras. The overly large size of the elements, required when relatively long exposure times are to be controlled, causes declining operating efficiency, and also the large elements have a tendency to become over heated in operation, these disadvantages being in addition to the previously mentioned disadvantage that the large size makes it difficult to fit the elements in a relatively small housing or casing.

Accordingly, it is an object of the present invention to provide a generally improved and more satisfactory electronic control for a photographic shutter, so designed as to eliminate or minimize the above mentioned disadvantages inherent in the prior art controls.

Another object is the provision of an electronic control made up of electronic components of relatively small size, so designed and arranged that the control system can control photographic exposures of relatively great duration, without causing over heating or other undesired thermal effects.

Still another object is the provision of an electronic control employing an impulse generator and at least one impulse counter which can be pre-set to the required count value depending upon the length of exposure desired, so designed and connected that the impulse generator and counter come into operation simultaneously with a first control impulse initiating the exposure, and will produce an exposure terminating impulse when the desired pre-set count has been reached.

A further object of the invention is the provision of an electronic exposure control so designed that, when the mechanism has been pre-set to produce an exposure of a given duration, the duration for which it has been set is plainly visible, and furthermore, that the indication of the pre-set exposure is not erased when the exposure is completed, but remains visible until ready for the next succeeding exposure, so that during the interval between successive exposures, the operator can see the duration or shutter speed at which the last preceding exposure was made.

BRIEF DESCRIPTION OF THE DRAWING

In the accompanying drawing, which is incorporated herein by reference and which constitutes a material part of the present disclosure.

DESCRIPTION OF THE PREFERRED EMBODIMENT

Figures 1, 2:
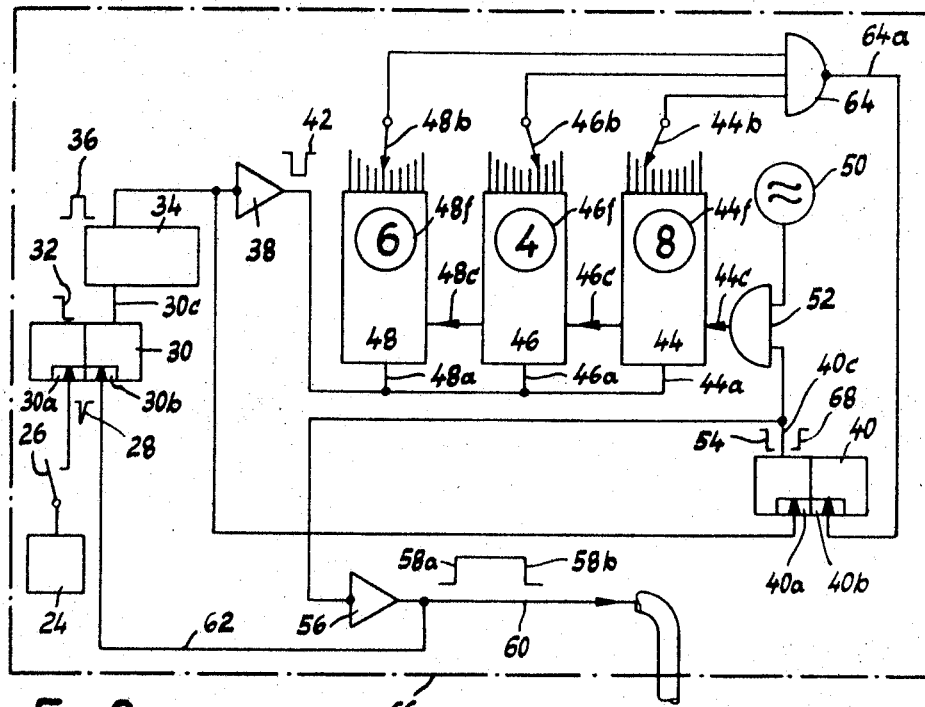
FIG. 1 is a somewhat schematic front face view of the principal mechanical operating parts of a shutter in accordance with a preferred embodiment of the invention, with the front cover and other parts removed in order to show the parts beneath.
FIG. 2 is an electrical diagram schematically showing the components of the electronic control and the manner in which they are connected to each other.

Referring first to the mechanical part shown in FIG. 1, the shutter in its preferred form comprises a housing or casing 10 having any desired number of shutter blades 12, only one of which has been shown for the sake of clarity. Each blade 12 is pivotally mounted at 10a and has a control slot 12a which receives a control pin 14a on a blade ring 14 mounted for rotation around the optical axis as a center; that is, around the objective aperture or exposure aperture 10b of the housing 10.

The blade ring carries a driving pin 14b which is received in a fork at one end of a double-armed lever 16 pivotally mounted on the shutter housing at 10c. The other end of the lever 16 is connected by a link 18 to the armature or core 20 of an electromagnet or solenoid having a winding 23. A spring 22 tends to move the armature 20 to one limit position in which the blade ring 14 is in its most counterclockwise position, with the blades 12 closed. When the winding 23 is energized, it pushes downwardly on the link 18, swinging the lever 16 on its pivot 10c, to move the blade ring 14 in a clockwise direction, to open the shutter blades. When the winding 23 is deenergized, the spring 22 will pull upwardly on the link 18, swinging the lever 16 to move the blade ring 14 in a counterclockwise direction, to close the shutter blades.

The electrical or electronic control system, constituting the principal part of the present invention, will be readily understood by those skilled in the electronics art, from the following description read in conjunction with FIG. 2 of the drawings.

There is an impulse emitter 24, which may be of conventional kind, such as a capacitor charged by conventional means. When the starting switch 26 is closed, a single impulse from the emitter 24, as diagrammatically shown at 28, is transmitted to the input 30a of a flip-flop unit or element 30. Upon receiving the input pulse 28, the flip-flop 30 moves from its zero condition and discharges a negative impulse, indicated diagrammatically at 32, at the output connection 30c, leading to an impulse former 34 the output of which is an impulse indicated diagrammatically at 36.

The impulse 36 produced by the element 34 goes to a branched conductor and is conducted thereby to a reversing amplifier 38 and also to the input 40a of a second flip-flop 40. The reversing amplifier 38 produces a negative impulse indicated diagrammatically at 42, which constitutes the choke pulse, and it goes to the respective inputs 44a, 46a, 48a of three series-connected decade impulse counters 44, 46, and 48 respectively, of the same type. The input of the choke impulse 42 to these counters 44, 46, and 48 brings all of these counters to the zero indication or zero position.

Each of the impulse counters can be set manually by a manual setting control member 44b, 46b, 48b, respectively, to any required decade value. In the situation illustrated in FIG. 2 as an example, the decade impulse counters have been set to values of 6, 4, and 8. With a reduction of 10 to 1 from the counter 44 to the counter 46, and a further reduction of 10 to 1 from the counter 46 to the counter 48, and assuming that the first impulse counter 44 is set for tenths of a second (as is preferably the case) it is seen that the illustrated setting is a setting for 648 tenths of a second, or in other words 64.8 seconds. The values of the figures for the individual impulse counters are shown electro-optically as flickering numbers in the indicator windows 44f, 46f, and 48f, respectively, of the respective counters, when the decoded situation is reached, such counters with electro-optical number indications being known per se in the art.

The impulses to be counted are produced by a counting impulse generator 50, conveniently a generator set to generate 10 impulses or cycles per second, sometimes called a 10-Hertz generator. This generator is connected through a NAND gate 52, the output of which goes to the impulse input 44c of the first counter 44. In the rest position, the NAND gate 52 is blocked, and it is opened by a single resilient impulse indicated diagrammatically at 54, which is derived from the output 40c of the flip-flop 40.

In addition to going to the NAND gate 52, the resilient impulse 54 is conducted also to a reversing amplifier 56, and thence is conducted, as an impulse indicated diagrammatically at 58a, to the conductor 60 which leads to the magnetic winding 23 of the electromagnetic shutter driving means within the shutter housing 10. In addition, the pulse 58a derived from the amplifier 56 is also conducted, through the conductor 62, to the input 30b of the flip-flop 30.

The setters 44b, 46b, and 48b are in the form of switches which transmit the signals resulting from the decoded setting of the impulse counters to another NAND gate 64. The output 64a of this gate 64 is connected to the input 40b of the flip-flop 40.

The connections for furnishing power to the impulse generator 50 and for setting it into operation are not shown, as these are conventional and will be well understood by those skilled in this art. Thus the generator 50 is conventionally connected to any suitable current source, in such a way that power is supplied to the generator 50 simultaneously with the closing of the switch 26 to initiate an exposure cycle, and power is cut off again at the end of the exposure control procedure, that is to say, when the pre-set impulse number is reached. Switching arrangements of this kind are known per se, and therefore need not be further described.

Furthermore, it is pointed out that the various elements or components, such as the NAND gates, the flip-flops, impulse counters, the impulse former, and other components, may all be of known normal form commercially available, so that the construction thereof need not be explained in detail. All of these elements or components may be installed, with a suitable small current supply source such as a small battery, inside the shutter housing 10, or they may be and preferably are placed in a separate switch box or housing 66, connected to the shutter 10 through the conductor 60, so that there is provision for remote control of the shutter from a distance.

The control arrangement described above operates as follows:

Assume that the switches 44b, 46b, and 48b have been set to the count value or numerical value corresponding to the required exposure time or shutter speed. In the case illustrated, this is 648 tenths of a second, or 64.8 seconds. When the operator is ready to make the exposure, he closes the switch 26 by operating any suitable manual trip member mounted, for example, on the switch box 66. The closing of the switch 26 sends the initial impulse 28 to the input 30a of the flip-flop 30. The impulse 32 produced at the output 30c of the flip-flop 30 is formed at the impulse former 34 into the impulse 36, which goes to the reversing amplifier 38 and is there reversed to form the choke impulse 42 supplied to the inputs 44a, 46a, and 48a of the individual counters, to cancel the indications previously exhibited at these counters. In addition, the impulse 36 also passes to the input 40a of the flip-flop 40 and as a result, the impulse 54 is formed at the output 40c of the flip-flop 40.

This first impulse 54 from the flip-flop 40 goes to the reversing amplifier 56 which then forms the first impulse 58a for controlling the shutter. This impulse 58a, lead through the conductor 60, energizes the magnetic winding 23 so that the armature 20 is moved and the shutter blades are opened.

At the same time, the impulse 54 from the flip-flop 40 also goes to the NAND gate 52, and serves to open this gate. The pulses from the impulse generator 50, set into operation simultaneously with closing the switch 26, can now pass through the NAND gate 52 to the input 44c of the first counter 44, thence with a 10 to 1 reduction to the input 46c of the second counter 46, and thence with another 10 to 1 reduction to the input 48c of the third counter 48.

When the pre-selected or pre-set decimal values have been reached on the counters 44, 46, and 48, all three functions or inputs of the NAND gate 64 will be positive. The negative jump or pulse which now occurs at the output 64a of the NAND gate 64 goes to the input 40b of the flip-flop 40, and throws this flip-flop back to its zero position. The impulse 68 which is consequently developed at this flip-flop 40 blocks the NAND gate 52 and at the same time is delivered to the reversing amplifier 56 thereby producing the second shutter-controlling impulse 58b from this amplifier 56, so that the current supply to the magnetic winding 23 of the shutter driving means is interrupted. The armature 20 will be moved by its spring 22, so that the shutter blades 12 are closed again, to terminate the exposure. The second shutter-controlling impulse 58b is also effective at the input 30b of the flip-flop 30 to return this flip-flop to the zero condition. The control operation is thus terminated. The figures seen in the indicator windows 44f, 46f, and 48f remain visible, however, even after the control operation has been terminated, and stay visible until cancelled by initiating a new exposure procedure or cycle by another closing of the switch 26.

It will be seen that, broadly stated, the invention comprises the use, in the control of a photographic shutter, of an impulse generator operatively connected to a plurality of impulse counters connected to each other in series, so that the first impulse counter comes into effect simultaneously with the first control impulse, and the last impulse counter provokes or causes the second control impulse when the set figure or value has been accomplished. Various other specific arrangements are possible, while still retaining this broad concept, and the specific arrangement here shown and described is intended merely as an example, subject to considerable variation within the skill of the art, without departing from the invention. Moreover, the mechanical parts as well as the electronic circuit parts can be considerably varied without departing from the invention. Thus the electronic control parts of the invention can be used in connection with shutters which are opened and closed by springs, and in which the electrical control impulses are used only for determining the lapse of time between the opening and closing of the shutter members without actually energizing a winding which serves to move the shutter blades in one direction or the other.

For the sake of clarity, the drawing illustrates the electrical circuits in simplified form which will, however, be readily understood to those skilled in the art. Such persons skilled in the art will, of course, understand that the usual conventional return conductors or return circuits are provided wherever necessary, by grounding or otherwise.

It is to be understood that the disclosure is given by way of illustrative example only, rather than by way of limitation, and that without departing from the invention, the details may be varied within the scope of the appended claims.

We claim:

1. A photographic shutter comprising means for opening and closing a light aperture to make an exposure of variable duration, the duration of said exposure being controlled by the interval between a first control impulse and a second control impulse, and means including an electrical system for producing said control impulses at a variable spacing from each other, said electrical system including a counting impulse generator, impulse counting means settable to a desired count value, means for rendering said counting means effective, simultaneously with production of a first control impulse, to count impulses produced by said generator, and means controlled by said counting means for producing a second control impulse when the impulses from said generator as counted by said counting means reach the count value for which said counting means has been set.

2. A construction as defined in claim 1, wherein said impulse counting means comprises a plurality of impulse counters in series with each other.

3. A construction as defined in claim 1, wherein said impulse counting means comprises a plurality of impulse counters arranged in a unidirectionally counting 10 to 1 decade series.

4. A construction as defined in claim 3, wherein said impulse counters include means for electro-optically indicating the count value to which each counter has been set.

5. A construction as defined in claim 4, wherein the indicated count value of each counter remains visible after the exposure has been terminated and until a choke impulse has been supplied to the counter.

6. A construction as defined in claim 5, further including means for supplying a choke impulse to each counter substantially simultaneously with production of a first control impulse.

7. A construction as defined in claim 1, wherein said impulse generator is operatively connected to said counting means through a first electronic gate, and said counting means is operatively connected to said second control impulse producing means through a second electronic gate.

8. A construction as defined in claim 7, wherein said first gate is a NAND gate and said second gate is also a NAND gate.

9. A construction as defined in claim 7, wherein said electrical system includes a flip-flop element having a first input controlled by a starting switch and a second input from an output of said second gate, and wherein an output of said flip-flop element is operatively connected to an input of said first gate, an impulse to the first input of said flip-flop element producing therefrom an output producing said first control impulse and also rendering said first gate effective to transmit impulses from said impulse generator to said counting means, an impulse from the output of said second gate to the second input of said flip-flop element producing therefrom an output producing said second control impulse and also rendering said first gate ineffective to transmit impulses.

10. Photographic exposure control means for controlling the length of an exposure, said control means including an impulse generator, impulse counter means settable to count a desired number of impulses, means for rendering said counter means effective at the beginning of an exposure to count impulses produced by said generator, and means activated by said counter means for terminating an exposure when said counter means has counted the number of impulses for which it has been set.